July 6, 1943.                DE WITT R. GODDARD                2,323,534
                           SHORT DOT TEST EQUIPMENT
                    Filed Dec. 12, 1941           3 Sheets-Sheet 1
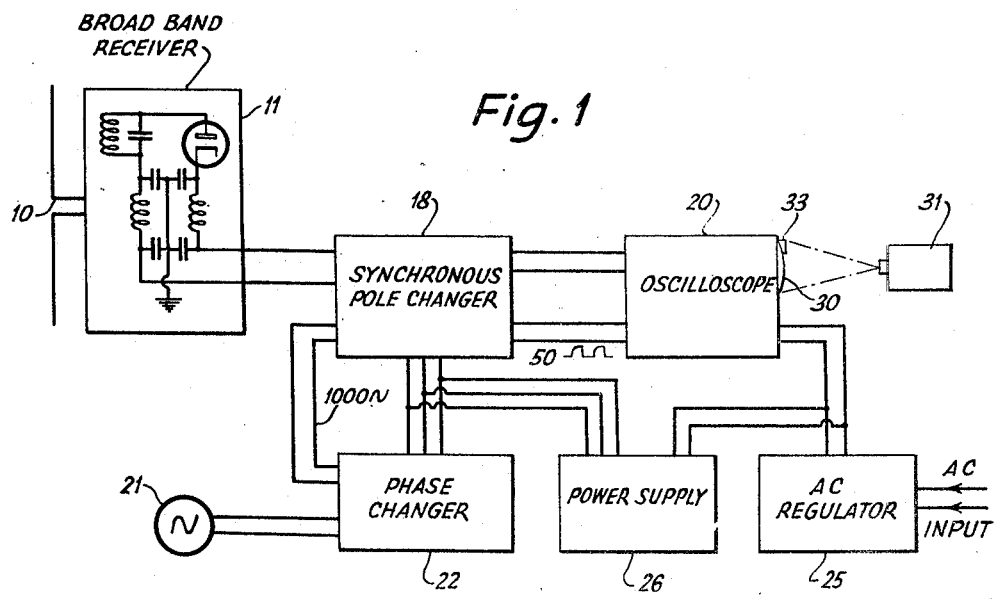
INVENTOR
DE WITT R. GODDARD
BY
ATTORNEY

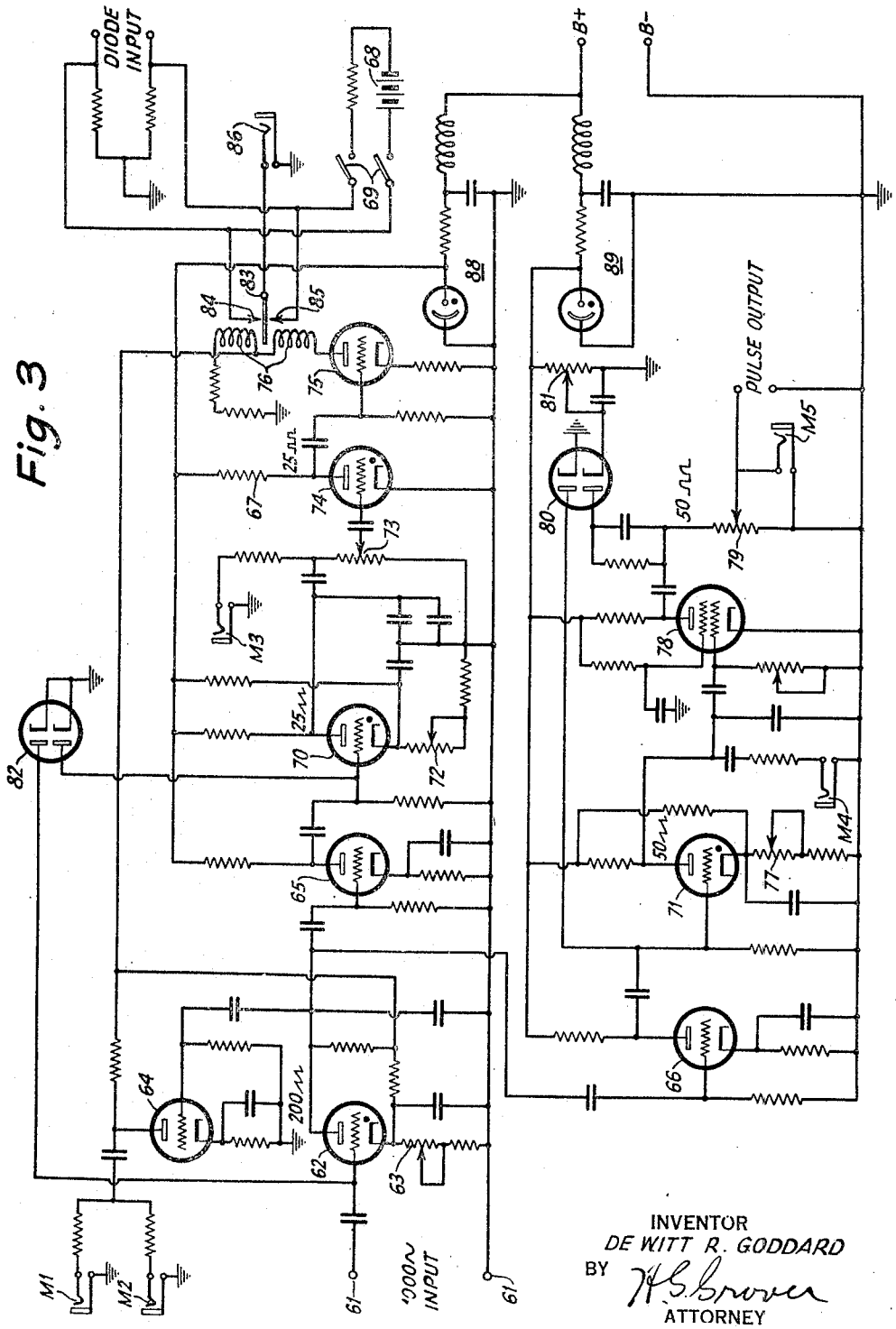

July 6, 1943.  DE WITT R. GODDARD  2,323,534
SHORT DOT TEST EQUIPMENT
Filed Dec. 12, 1941  3 Sheets-Sheet 3
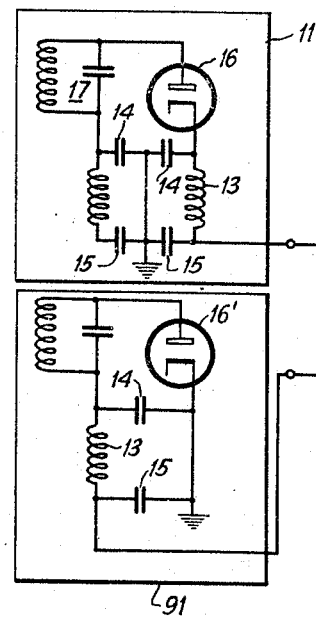
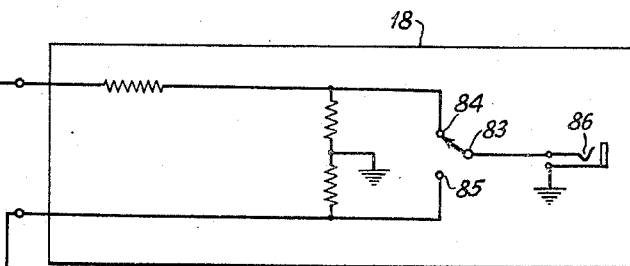
Fig. 4
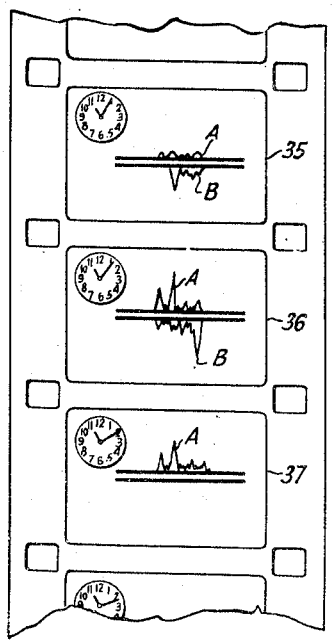
Fig. 5
INVENTOR
DE WITT R. GODDARD
BY
ATTORNEY Patented July 6, 1943

2,323,534

UNITED STATES PATENT OFFICE 2,323,534

SHORT DOT TEST EQUIPMENT

De Witt Rugg Goddard, Riverhead, N. Y., assignor to Radio Corporation of America, a corporation of Delaware Application December 12, 1941, Serial No. 422,625

12 Claims. (Cl. 250—17)

The present invention relates to radio channel test equipment and, more particularly, to a means for comparing the transmission of test dots over different radio frequency channels or from different antennae and transmitters.

An object of the present invention is the comparison of the transmission of signal impulses from a plurality of radio transmitters and antennae associated therewith.

Another object of the present invention is the comparison of the transmission of signal impulses over several ether propagation paths between a radio transmitter and a receiver.

Still a further object of the present invention is the provision of radio receiving and recording equipment for performing the above mentioned comparisons.

In accordance with the principles of the present invention it is proposed to transmit short impulses of radio frequency energy alternately from two antennas of different design but operating on the same frequency. The impulses may consist of alternate 100 microsecond impulses sent from the two transmitters at a rate of 25 impulses per second each. The transmitters may operate on the same frequency feeding different antennae at approximately the same geographic location. Alternatively, different frequencies and the same type of antenna may be used or the antennae may be at different locations and operate on the same or different frequencies. The pulse generator for keying the transmitters may be of the type shown in Finch application #277,867, filed June 7, 1939, Patent No. 2,271,186, January 27, 1942. The pulses are received through a single antenna and receiver and spread on the face of an oscilloscope in such fashion that the pattern from one transmitter and antenna extends upwards from the horizontal axis of the oscilloscope and the pattern from the other transmitter and antenna extends downwards from the axis with the bases of the patterns substantially in coincidence. Each received impulse usually arrives at the receiving antenna as a number of spaced pulses instead of just one due to the presence of more than one propagation path through the ether. The reproduced wave patterns are photographed on motion picture film one frame at a time, at 30 second intervals for selected periods of time during a test. Also a few lengths of motion pictures are photographed at intervals of about an hour. The impulse pattern for each transmitter may be identified by periodically interrupting transmission from one of the transmitters.

The present invention will be more fully understood by reference to the following detailed description which is accompanied by drawings in which Figure 1 illustrates in block diagram form an embodiment of the present invention; Figure 2 illustrates a circuit diagram of the phase changer of Figure 1; Figure 3 illustrates a circuit diagram of the pole changer of Figure 1; Figure 4 illustrates a modification of a portion of Figure 1 for reception of the signals on a pair of separate receivers, while Figure 5 illustrates a few typical frames from a film record obtained during the operation of the embodiment of Figure 1.

In Figure 1 there is shown a receiving antenna 10 coupled to a receiver 11. The satisfactory reception of extremely short impulses requires a receiver that has a rather broad tuning characteristic with not too steep sides on the characteristic curve. The receiver utilizes a diode rectifier output of somewhat different form than the standard since the output must be free from ground. This is accomplished by utilizing low pass filters in series between each side of the rectifier circuit and the output terminals, that is, a low pass filter composed of choke 13 and condensers 14 and 15, is connected in series between the cathode of rectifier tube 16 and one output terminals, while a similar low pass filter comprising choke 13' and condensers 14' and 15' is connected between one end of the final intermediate frequency transformer 17 and the other output terminals. The diode output of receiver 11 passes through a synchronous pole changer unit 18 to the input terminals of the vertical deflection plates of oscilloscope 20. The pole changer unit also provides a 50 cycle voltage for synchronizing the sweep circuit within the oscilloscope. A standard source of 1000 cycle oscillations, 21, is provided for synchronizing purposes. The output of the standard source is fed through a phase changer unit 22 to the pole changer unit 18 for synchronizing purposes. The phase changer provides a simple means for positioning the pulse pattern on the oscilloscope screen and compensating for drift between the frequency standards at the transmitting and receiving stations.

The possibility of drift in the receiving equipment is reduced by utilizing a regulator 25 between the alternating current input source and the power supply 26 for the phase changer and the pole changer. The regulated alternating current is also applied to the oscilloscope 20. It is not necessary to apply regulated supply voltages to the receiver since the effects of such variations are comparatively small.

In the study of multi-path effects it is desirable that the pattern on the screen 30 of oscilloscope 20 be spread out sufficiently for good resolution of detail. For an oscilloscope having a 5 inch screen a scale of about 1 inch to 1½ inches per millisecond along the horizontal axis has proved satisfactory. This choice may have to be modified in case echo delay times in excess of two or three milliseconds are encountered. Usually, a horizontal sweep rate of 200 cycles is used.

For the purpose of making permanent records of the received pulse patterns on the oscilloscope screen 30 a motion picture camera 31 is arranged to photograph the screen. The use of a 16 millimeter camera provides a record which may be accurately measured without involving excessive film costs. In a protecting casing 33 a watch is so arranged that each picture taken by camera 31 of the oscilloscope screen 30 also contains a time record of the event.

While not shown in Figure 1, it is desirable to provide a black cloth hood between the motion picture camera and the oscilloscope in order to avoid obscuring detail in the film record due to extraneous light.

Figure 5 of the drawings illustrates a few typical frames of a record of a test with the apparatus of Figure 1. The successive frames shown are merely exemplary and do not necessarily represent any three consecutive pictures actually taken in a test. The first frame 35, taken at 11:05, shows the traces A and B from a pair of separate signal pulses. It will be noted that in this frame there are several small impulses received as a result of a single transmitted impulse, none of the several impulses being substantially larger than any of the others. On the other hand, the trace B shows one extremely high pulse at the beginning of the trace and several smaller echo impulses. It may be generally assumed that the first impulse arrives by the most direct path while the later ones take more indirect paths. A second frame, 36, taken somewhat later, that is, at 11:07 shows that now the trace A from one transmitter has one extremely high amplitude echo impulse and several smaller echo impulses. In the trace B from the other transmitter, the original impulse is quite small, and is followed by several small echo impulses and one of considerable amplitude. Frame 37, taken at 11:10, shows only trace A from one transmitter, this frame being taken at a time when the other transmitter was interrupted in order to provide a positive correspondence of each of the traces with its respective transmitter. While not shown in Figure 5, a few frames of 1000 cycle timing wave must be included at frequent intervals such that echo delay times may be readily determined by direct measurements of the image on the film.

The block diagram of the equipment now having been described, certain portions of the equipment, which are illustrated in more detail in subsequent figures, will now be described with reference to these figures.

In Figure 2 is shown the phase changer 22 in more detail. The input transformer 40 of the phase changer is coupled to the standard 1000 cycle frequency source 21 of Figure 1. A maximum output of about 5 volts across a 600 ohm load is available with about 1 volt input to the phase changer. The phase changer unit includes an input coupling tube 41, the plate circuit of which feeds 1000 cycle current to two circuits, one containing an inductance 43 and the other, a condenser 44. The potential between the ungrounded sides of 43 and 44 may be made to have the difference in phase of 120 degrees by adjusting the two potentiometers 45 and 46. Potentiometer 47 provides a means of equalizing the voltages applied to following coupling tubes 50, 51. Potentiometer 48 in the input circuit of tube 41 provides a third potential which, by adjustment of potentiometers 45 and 46, may be made to have a 120 degree phase relationship with the voltages across choke 43 and condenser 44. These three potentials, having mutually 120 degree phase relationships between them, excite the three coupling tubes 50, 51 and 52. The anode circuits of tubes 50, 51 and 52 each contain one of the three primary windings of a phase changing transformer 53. The armature 54 of the phase changing transformer has induced in it a 1000 cycle current, the phase of which is dependent upon the position of armature 54 within the primary or stator winding. Each revolution of the armature provides a uniform continuous shift in phase of 360 degrees. Transformer 55 provides a loose coupling from the output of armature 54 to coupling tubes 56 and 57. The secondary of transformer 55 is tuned to 1000 cycles by means of condenser 55' to remove harmonics and so provide a pure 1000 cycle potential to the grids of two output coupling tubes 56 and 57. Output terminals 58 and 59 are coupled to the anode circuits of coupling tubes 56 and 57. One output is connected to the synchronous pole changer 18 of Figure 1, as indicated by the leads labelled 1000 ~.

Initial adjustment of the phase changer unit is most easily accomplished with the aid of an oscilloscope. The oscilloscope sweep should be adjusted to 250 cycles and synchronized with one of the phase changer outputs, say, that at terminals 58. The other output terminals, 59, are connected to the vertical input terminals of the oscilloscope. Then the phase changing transformer armature winding 54 is continuously rotated, say, at the rate of 1 or 2 revolutions per second. While this is being done, the various adjustable potentiometers 45, 46 and 47 and 48 are adjusted until the sine wave on the oscilloscope shows a constant amplitude. If a rapid rotation of the armature 54 in one direction shows a decreasing amplitude of the wave on the screen and a rotation in the other direction an increase in amplitude, the value of condenser 55' is incorrect so that the parallel tuned circuit consisting of the secondary of transformer 55 and the condenser 55' no longer tunes at 1000 cycles. If this effect becomes pronounced condenser 55' must be changed to the correct value. Normally, of course, it will not be necessary to make any adjustments of the phase changer unit in the normal routine of operating the equipment.

The synchronous pole changer and pulse generator unit shown in Figure 3 performs two separate functions. The first function provides 25 cycle reversals from a balanced input and the second function provides short pulses at the rate of 50 cycles for use in arrival angle measurements and similar work. The duration of the pulse may be varied from about 20 microseconds to 2 milliseconds. Provision is also made within the pole changer to change the shape of the pulse from a flat top pulse to one having a rising characteristic as desired. Both of the above functions operate as sub-multiples of the standard 1000 cycle input from generator 21. The 1000 cycle input is connected to terminals 61 in the grid circuit of tube 62. Tube 62 is a gas tube in a relaxation oscillator type of frequency divider. Cathode potentiometer 63 is adjusted so that tube 62 fires once for each 5 cycles of the input wave thus giving a 200 cycle sawtooth wave in the plate circuit. The plate circuit of tube 62 is coupled to the grids of coupling tubes 64, 65 and 66. Tube 64 feeds 200 cycle monitor jacks M1 and M2 and tubes 65 and 66 for further frequency divider circuits. Gas tube 70 acts as a second relaxation oscillator frequency divider having an output frequency of 25 cycles. The division factor is adjusted by means of cathode potentiometer 72 for a 25 cycle output in the same way as in the case of tube 62. Monitor jack M3 is provided to check the operation of the divider. The 25 cycle output is coupled through potentiometer 73 to the input of a relaxation oscillator circuit including tube 74. Resistor 67 in the anode circuit of tube 74 is of such high value that the circuit acts to change the sawtooth wave output from tube 70 to square wave having a flat top and vertical sides. Tube 74 has its output coupled to an amplifier tube 75 which serves as a power amplifier to drive the pole changer relay 76. Potentiometer 73 varies the duration of the top of the square wave output of tube 74. It serves to adjust the time of contact of arm 83 of relay 76 with contacts 84 and 85 to equality. Relay 76 should be adjusted so that the gap between each of the fixed contacts 84 and 85 and the moving arm 83 is very small. The adjustment should be such that when battery 68 is connected across the relay contacts by means of switch 69 and the vertical deflecting plates of the oscilloscope are plugged into jack 86a a pair of traces appear on the oscilloscope screen, one above the other and of substantially equal length.

The frequency of the 50 cycle divider 71 is adjusted by means of a cathode potentiometer 77. Monitor jack M4 is provided to check its operation. The 50 cycle sawtooth wave output from tube 71 is fed to the grid of coupling and shaping tube 78, the duration of the output pulses and their amplitude being adjusted by means of potentiometer 79. The anode side of potentiometer 75 is coupled to a network including one of the diodes in tube 80. By varying the potentiometer 81 in the cathode circuit of this diode the point on the wave at which the diode begins to conduct may be adjusted to give either a short flat top impulse wave form or an impulse with a gradually rising wave front. A further monitor jack M5 is provided for making this adjustment. The variation in wave form allows for more accurate synchrnization of the horizontal sweep of the oscilloscope of Figure 1. The remaining diode in tube 80 and the two diodes in tube 82 are used as limiters across the input connections of tubes 71, 62 and 70 to keep the peak value of the locking voltages constant. Voltage regulator circuits 88, 89 maintain the anode voltages constant to further stabilize the operation.

Throughout Figure 3, wherever a change in frequency or wave shape takes place, the frequency and wave form are indicated. The wave forms shown are purely illustrative and do not attempt to show the exact wave form or frequency.

The apparatus shown in Figure 1 may also be adapted to compare alternate short pulses received by two independent receivers which may be connected to two different types of antennas and/or may be operating on different frequencies. This modification is shown in Figure 4 wherein the receiver 11 may be that of Figure 1 and the second receiver 91 is similar, except that only one side of the diode output circuit is free from ground. The cathode of rectifier tube 16' in receiver 91 is connected to ground and only a single low pass filter 13', 14' and 15' is utilized. It will be seen that opposite polarities of the two diode circuits are grounded and the operation of the arm 83 of relay 76 alternately connects the two receiver outputs to jack 86 in opposite senses and thus to the oscilloscope. One receiver output will take the place of trace A (Figure 5), while the other takes the place of trace B.

While I have particularly described and illustrated several embodiments of my invention, it is to be clearly understood that my invention is not limited thereto but that modifications may be made within the scope of the invention.

I claim:

1. In a radiant energy system wherein short pulses of high frequency energy are alternately radiated from different antennae, means for receiving said pulses, means for demodulating said pulses, an oscilloscope having means associated therewith for deflecting a visible spot across a screen in synchronism with the rate of transmission of said pulses, connections from said demodulating means to means for deflecting said spot in a direction normal to said first deflection and means for changing the polarity of said connections in synchronism with the rate of alternation of radiation whereby the trace of said spot on said screen representative of pulses from one of said antennae is separated from the trace representative of pulses from the other of said antennae.

2. In a radiant energy system wherein short pulses of high frequency energy are alternately radiated from different antennae, means for receiving said pulses, means for demodulating said pulses, an oscilloscope having means associated therewith for deflecting a visible spot across a screen in synchronism with the rate of transmission of said pulses, connections from said demodulating means to means for deflecting said spot in a direction normal to said first deflection and means for reversing the polarity of said connections in synchronism with the rate of alternation of radiation whereby the trace of said spot on said screen representative of pulses from one of said antennae is opposed from the trace representative of pulses from the other of said antennae.

3. In a radiant energy system wherein short pulses of high frequency energy are alternately radiated from different antennae, means for receiving said pulses, means for demodulating said pulses, an oscilloscope having a screen, means for deflecting a spot horizontally across said screen in synchronism with the rate of transmission of said pulses to form a time axis, and vertical deflecting means, connections from said demodulating means to said vertical deflecting means, and means for reversing the polarity of said connections in synchronism with the rate of alternation of radiation whereby the pattern on said screen representative of pulses from one of said antennae is reversed vertically with respect to the other.

4. In a radiant energy system wherein short pulses of high frequency energy are alternately radiated from different antennae, means for receiving said pulses, means for demodulating said pulses, an oscilloscope having a screen, means for deflecting a spot horizontally across said screen in synchronism with the rate of transmission of said pulses to form a time axis, and vertical deflecting means, connections from said demodulating means to said vertical deflecting means for reversing the polarity of said connections in synchronism with the rate of alternation of radiation whereby the pattern on said screen representative of pulses from one of said antennae is reversed vertically with respect to the other, and means for photographing said screen.

5. In a radiant energy system wherein short pulses of energy are alternately radiated from different antennae and are received at a receiving location, the method of determining the transmission characteristics of said antennae which comprises demodulating said received pulses, forming visible traces representative of each of said received pulses, said traces being disposed in an opposing relationship with respect to a common reference line, and comparing said traces.

6. In a radiant energy system wherein short pulses of energy are alternately radiated from different antennae and are received at a receiving location, the method of determining the transmission characteristics of said antennae which comprises demodulating said received pulses, forming visible traces representative of each of said received pulses to the same relative scale, said traces being disposed in an opposing relationship with respect to a common reference line, and comparing said traces.

7. In a radiant energy system wherein short pulses of high frequency energy are alternately radiated from different antennae, means for receiving said pulses including a rectifier, means for applying high frequency energy to said rectifier, an output circuit for said rectifier having its center point grounded, a single pole double-throw switch having fixed contacts connected to the ends of said output circuit and a movable contact connected to one of a pair of vertical deflecting plates of an oscilloscope, the other of said plates being grounded and means for operating said switch in synchronism with the rate of alternation of radiation.

8. In a system, as set forth in claim 3, a single standard source of high frequency oscillations, means for deriving from said oscillations a low frequency square wave for operating said polarity reversing means, means for deriving from said same source a low frequency wave having a definite integral relationship to said square wave for synchronizing said horizontal deflection, said wave having a sloping wave front and means for varying the slope of said wave front whereby the time relationship between said polarity reversals and the beginning of each horizontal deflection may be adjusted.

9. In a system wherein a pair of operations recur at different rates which bear a definite integral relationship one with the other, means for deriving control impulses for said operations at said different rates from a single source of a standard frequency wave, said control impulses for one of said operations being effective at a predetermined minimum amplitude and means for varying the shape of the wave front of said last mentioned control impulses whereby the relative effects of said operations may be varied without varying said rates.

10. In a system wherein a pair of operations recur at different rates which bear a definite integral relationship one with the other, means for deriving control impulses for said operations at said different rates from a single source of a standard frequency wave, said control impulses for one of said operations being effective at a predetermined minimum amplitude and means for varying the shape of the wave front of said last mentioned control impulses whereby the relative effects of said operations may be varied without varying said rates, and means capable of continuous rotation of the phase of said standard frequency wave for simultaneously adjusting the relationship of both of said operations with respect to an external recurrent operation.

11. In a system wherein a pair of operations recur at different rates which bear a definite numerical relationship one with the other, means for deriving control impulses for said operations at said different rates from a single source of alternating current, said control impulses for one of said operations being effective at a predetermined minimum amplitude and means for varying the shape of the wave front of said last mentioned control impulses whereby the relative effects of said operations may be varied without varying said rates.

12. In a system wherein a pair of operations recur at different rates which bear a definite numerical relationship one with the other, means for deriving control impulses for said operations at said different rates from a single source of alternating current, and means capable of continuous rotation of the phase of said alternating current for simultaneously adjusting the relationship of both of said operations with respect to an external recurrent operation.

DE WITT RUGG GODDARD.